United States Patent [19]

Moddel et al.

[11] Patent Number: 4,941,735
[45] Date of Patent: Jul. 17, 1990

[54] OPTICALLY ADDRESSABLE SPATIAL LIGHT MODULATOR

[75] Inventors: Garret R. Moddel; Kirstina M. Johnson, both of Boulder, Colo.

[73] Assignee: University of Colorado Foundation, Inc., Boulder, Colo.

[21] Appl. No.: 318,775

[22] Filed: Mar. 2, 1989

[51] Int. Cl.$^5$ .................................................. G02F 1/13
[52] U.S. Cl. ..................................... 350/342; 350/333; 350/331 R; 350/338; 350/385; 350/334; 250/213 R
[58] Field of Search .................... 350/350 S, 333, 336, 350/342, 339 R, 345, 331 R, 338, 334, 385, 403; 250/213 R

[56] References Cited

U.S. PATENT DOCUMENTS

| | | | |
|---|---|---|---|
| 3,824,002 | 7/1974 | Beard | 350/342 |
| 3,855,579 | 12/1974 | Grenot et al. | 350/342 |
| 4,110,014 | 8/1978 | Yevick | 350/342 |
| 4,277,145 | 7/1981 | Hareng et al. | 350/351 |
| 4,367,924 | 1/1983 | Clark et al. | 350/350 S |
| 4,368,386 | 1/1983 | Huignard et al. | 250/213 R |
| 4,538,884 | 9/1985 | Masaki | 350/361 |
| 4,619,501 | 10/1986 | Armitage | 350/386 |
| 4,655,554 | 4/1987 | Armitage | 350/386 |
| 4,679,910 | 7/1987 | Efron et al. | 350/335 |
| 4,693,561 | 9/1987 | Ashley | 350/336 |
| 4,728,174 | 3/1988 | Grinberg et al. | 350/334 |
| 4,826,293 | 5/1989 | Grinberg et al. | 350/331 R |

OTHER PUBLICATIONS

"Amorphous Silicon Photoconductor in a Liquid Crystal Spatial Light Modulator", by Paul R. Ashley & Jack H. Davis, *Applied Optics*, 15 Jan. 1987, vol. 26, No. 2, pp. 241-246.

"High-Speed Light Valve Using an Amorphous Silicon Photosensor and Ferroelectric Liquid Crystals", by N. Takahashi, H. Asada, M. Miyahara & S. Kurita, *Applied Physics Letters*, vol. 51, No. 16, 19 Oct. 1987.

"Photoaddressing of High Speed Liquid Crystal Spatial Light Modulators", by Garret Moddel, Kristina M. Johnson, Mark A. Handschy, Reprint from *The Proceedings of Spie-The International Society for Optical Engineering*, vol. 754, 13-15 Jan. 1987, pp. 207-213.

Primary Examiner—Stanley D. Miller
Assistant Examiner—Huy K. Mai
Attorney, Agent, or Firm—Francis A. Sirr

[57] ABSTRACT

A liquid crystal spatial light modulator is disclosed having a pair of spaced transparent plates on which two electrically conductive films are coated in confronting relation. A continuous or discontinuous photosensitive film is coated on one of the conductive films. A bistable ferroelectric liquid crystal is confined between the other conductive film and the photosensitive film. An activating voltage source is applied to the conductive films. Modulator pixels are defined by a plurality of small electrically conductive elements that are carried by the photosensitive film. These conductive elements may be either transparent to a reading wavefront, or they may be reflective to a reading wavefront. An apertured film is also mounted on the photosensitive film substantially coplanar with the conductive elements. The apertures in this film coincide with the positions of the conductive elements and are spaced therefrom, to thereby leave a ring-shaped area of exposed photosensitive film surrounding each reflector element. A plurality of opaque rings are carried by said other conductive film, so as to overlie the ring-shaped area of exposed photosensitive film that surrounds each conductive element. Individual pixels of the modulator are addressed by light activating the portion of the photosensitive film that is associated with the addressed pixel's individual conductive element. Photodiode and photoconductive pixel cells are disclosed.

51 Claims, 4 Drawing Sheets

OPTICALLY ADDRESSABLE SPATIAL LIGHT MODULATOR

This invention was made with Government support under AFOSR-86-0189 awarded by the Air Force. The Government has certain rights in this invention.

FIELD OF THE INVENTION

This invention relates to the field of optical systems and elements, and more specifically to optically addressable spatial light modulators or light valves incorporating liquid crystal means.

BACKGROUND OF THE INVENTION

Spatial light modulators (SLM), as the term is used herein, are optical masks having a plurality of small pixel areas that are individually and selectively switchable. SLMs are used to modulate a reading optical wavefront, causing the wavefront to be either transmitted through the SLM (i.e. a transmission mode device), or to be reflected from the SLM (i.e. a reflection mode device), with a polarization that is determined by the modulator. These optical masks are usually two-dimensional, and comprise a plurality of small picture elements (i.e. pixels or PELS) that may be arranged in a two or three dimensional matrix of rows and columns.

In an optically addressable SLM, a write beam(s), for example a visible laser beam(s), programs or activates the individual pixels of the SLM to subsequently rotate the polarization of a read beam(s), for example an infrared laser beam(s). The write beam(s) programs the SLM by activating individual photosensitive pixel areas of the SLM. That is, those modulator areas that are to be programmed to rotate the polarization of a read beam(s) are activated by a write beam(s). U.S. Pat. No. 4,538,884 is an example. In the device of this patent, a pair of glass plates 1a and 2a support a pair of transparent electrodes 2a and 2b. A photoconductive layer 9, which can be amorphous silicon, is supported on electrode layer 2b. A plurality of aluminum reflectors 8 are incorporated into a transparent insulating layer 7 and are supported on the surface of the photoconductive layer, with the reflectors directly adjacent the photoconductive layer. An apertured shading layer 5 of carbon or metal is carried on the transparent insulating layer, each apertures 6 facing one of the reflectors. The space intermediate transparent insulating layer 7 and transparent electrode 2a is occupied by a liquid crystal 3. Other light activated spatial light modulators are shown in U.S. Pat. Nos. 4,619,501 and 4,655,554 wherein activating light produces a surface charge pattern that modulates the index of refraction of an electro-optic crystal; U.S. Pat. No. 4,693,561 wherein the voltage applied to aluminum strips that are in contact with a liquid crystal operate to destroy the twist of the liquid crystal in the grating space between the aluminum strips, and wherein activating light operates on a photoconductive layer to reduce the potential in the grating spaces, whereby light modulation occurs; and U.S. Pat. No. 4,679,910 which discloses two liquid crystal cells in series, a photoconductive substrate being disposed between the cells, and a mirror being disposed after the second cell. Other patents that may be of interest are U.S. Pat. No. 3,855,579 which shows an optic relay having a multi-layer dielectric mirror in direct contact with an electro-optical material; U.S. Pat. No. 3,824,002 which describes a liquid crystal light valve wherein all electrically conductive elements are isolated from the liquid crystal, and as a result, photoactivation must be accomplished by using the principle of impedance matching; U.S. Pat. No. 4,368,386 which discloses a liquid crystal image converter that can be configured to operate in either the transmissive or the reflective mode; and U.S. Pat. No. 4,277,145 which discloses a reflective mode liquid crystal display device wherein a writing beam in the presence of an applied voltage causes a transition in the liquid crystal to the isotropic phase, whereupon an image may be readout by light that passes through the liquid crystal and is reflected from a reflecting electrode.

The use of amorphous silicon photoconductor means in a liquid crystal device is suggested in the article "*Amorphous silicon photoconductor in a liquid crystal spatial light modulator*", by Paul R. Ashley and Jack H. Davis, APPLIED OPTICS, Jan. 15, 1987, Vol. 26, No. 2, at pages 241–246.

The use of amorphous silicon photoconductor means and ferroelectric liquid crystal means in a liquid crystal device is suggested in the article "High-speed light valve using an amorphous silicon photosensor and ferroelectric liquid crystals", by N. Takahashi, H. Asada, M. Miyahara and S. Kurita, APPLIED PHYSICS LETTERS, Vol. 51, No. 16, Oct. 19, 1987.

The use of a ferroelectric liquid crystal in an SLM having reflective mode photodiode or photoconductive portions is suggested in *THE PROCEEDINGS OF SPIE—THE INTERNATIONAL SOCIETY FOR OPTICAL ENGINEERING*, Vol. 754, Jan. 13–15, 1987, at pages 207–212, incorporated herein by reference.

SUMMARY OF THE INVENTION

The present invention relates to optically addressable spatial light modulators utilizing a chiral smectic liquid crystal element having plural states, for example plural state electroclinic (smectic $A^*$), or two state ferroelectric (smectic $C^*$). Data is stored in the modulator by causing selected pixel areas of the liquid crystal to switch from one stable state to the other stable state under the influence of a writing beam(s) of light and an applied electric field. The written modulator is nonvolatile in that, in the absence of an erasing means, the liquid crystal molecules remain in their last-set state. Liquid crystals of this type are birefringent, with the orientation of their optical axis being dependent on the molecular orientation of the liquid crystal.

Exemplary embodiments of a modulator constructed and arranged in accordance with the invention comprise a two-dimensional array of pixel cells, for example an X-Y square or rectangular array of cells. Since the modulator of the invention may take a variety of physical forms, the invention is not to be limited to either a two dimensional array or to an X-Y array.

The plurality of modulator pixels are defined by a like plurality of small, individual, isolated electrically conductive elements. In a transmission mode modulator constructed in accordance with the invention, these conductive elements are transparent to a reading wave front. In a reflection mode modulator constructed in accordance with the invention, these conductive elements operate to reflect the reading wave front, i.e. they are reflectors. Each conductive element is in physical contact with a continuous film of a liquid crystal means, the film being located on one side of the conductive elements. The other side of each conductive element is in physical contact with a continuous photosensitive layer or film, this film being located on the other side of the conductive element from the liquid crystal layer or film. As is conventional, thin alignment layers may be provided immediately adjacent both sides of the liquid crystal layer, to orient the liquid crystal in a desired direction.

The modulator is written or programmed by activating selected pixel areas or portions of the photosensitive layer (i.e. the areas or portions of the photosensitive layer that are defined by the individual conductive elements) using a write light beam(s). These selected pixel portions define input data of one form or another that is to be stored in the modulator.

When the photosensitive layer is so activated, a switching electrical field or voltage is applied to the associated pixel areas of the liquid crystal, by way of a circuit that extends through the photosensitive layer's activated pixel portions and through the associated conductive elements. When an electric field is applied across a pixel area of the liquid crystal, the molecules therein rotate into one of two stable states. As a result, selected pixel areas of the liquid crystal switch, and the input data is stored therein in the form of switched pixel areas.

Subsequently, the data stored in the modulator can be read out by way of a reading light beam(s) that enters the modulator from either side of the modulator in the case of a transmission mode modulator, or that enters the modulator from the opposite side from the side of entry of the write beam(s) in the case of a reflection mode modulator. As is desired, the write and read light beams can be differentiated from one another by their wavelength, intensity, and/or timing.

The above mentioned photosensitive layer functions to convert absorbed writing light energy into localized electric field areas within the adjacent liquid crystal area. These localized electric field areas determine the localized state of the adjacent pixel area(s) of the liquid crystal.

Preferably, but without limitation thereto, the photosensitive portion of the modulator comprises a hydrogenated amorphous silicon (a-Si:H) based multilayer film.

The individual photosensitive layer pixel areas or cells of the modulator can be constructed and arranged to operate in a photodiode mode or in a photoconductor mode.

A bipolar source of switching voltage may be applied to the pixel cells to facilitate the various modes of operation of the modulator, such as, for example, erasing the ferroelectric photodiode mode modulator, or erasing the ferroelectric continuous-layer photoconductor mode modulator. A bipolar source of switching voltage and full matrix illumination may be applied to the pixel cells to facilitate erasing the ferroelectric discontinuous-layer photoconductor mode modulator.

In a liquid crystal spatial light modulator in accordance with the invention, the individual pixel conductive elements may be in direct physical contact with the liquid crystal. More specifically, in the present invention a liquid crystal is confined between a conductive film and a photosensitive film. The individual modulator pixels are defined by a like plurality of small conductive elements, which may be reflectors, that are carried on the photosensitive film.

The liquid crystal material of the present invention is preferably, but without limitation thereto, a ferroelectric liquid crystal material of the type described in U.S. Pat. No. 4,367,924, incorporated herein by reference.

An apertured film is also carried by the photosensitive film, substantially coplanar with the conductive elements or reflectors. The apertures in this film surround each of the conductive elements, leaving an exposed ring of photosensitive film surrounding each of the conductive elements. This apertured film may be either opaque to or transmissive of the reading radiation.

A plurality of light-blocking rings are carried in overlying relation to these exposed rings of photosensitive film, to thereby block reading radiation from striking this portion of the photosensitive film when the reading radiation is directed to the modulator from that side of the modulator.

An object of the invention is to provide a multi-pixel liquid crystal spatial light modulator having an array of picture elements, the modulator having a pair of substantially parallel, closely spaced, and transparent plates, a pair of transparent and electrically conductive films, one film being being carried by each of the plates in facing relationship, a photosensitive film carried by one of the conductive films, and the modulator's picture elements being defined by a conductive-element pattern that is carried by the photosensitive film, the conductive-element pattern having a plurality of picture elements arranged in the shape of said array, each individual picture element of the pattern being isolated from all other elements of the pattern, and each element of the pattern defining an individual picture element of the modulator, activating voltage means connected to the conductive films, and liquid crystal means confined between the one conductive film and the photosensitive film, whereby individual picture elements of the modulator are addressed by activation of the portion of the photosensitive film that is associated with individual conductive elements.

Another object of the invention is to provide a method for constructing a liquid crystal spatial light modulator comprising a two dimensional pixel matrix, comprising the steps of; providing a pair of spaced light-transparent and conductive films, providing a light-responsive film on one of the conductive films in confronting relation to the other of the conductive films, confining a liquid crystal between the other conductive film and the light-responsive film, providing a plurality of isolated conductive elements on the light-responsive film, the conductive elements being arranged in the two dimensional form of the pixel matrix, providing an apertured layer substantially coplanar with the conductive elements, the apertures in the layer being arranged in the two dimensional form of the pixel matrix so as to coincide with the locations of the conductive elements, whereby individual pixels of the modulator are addressed by light activating the portion of the light-responsive film that is associated with individual conductive elements.

As a feature of the invention, a layer of opaque rings is spaced to overlie the ring areas of the light-responsive film that lie between each conductive element and its adjacent portion of the apertured layer.

As a feature of the invention, the apertured layer may be connected to ground potential, or to a source of bias potential.

As a feature of the invention, the liquid crystal comprises a ferroelectric liquid crystal, and as a further feature, a bipolar source of potential may be applied to the conductive films to facilitate the various modes of operation of the modulator, such as writing, reading and erasing.

As a feature of the invention, the individual pixel portions of the photosensitive or light-responsive film may be configured as photodiodes or photoconductors. These and other objects and advantages of the invention will be apparent to those of skill in the art upon reference to the following detailed description of the invention, which description makes reference to the drawing.

DETAILED DESCRIPTION OF THE INVENTION

The present invention will be described making reference to a spatial light modulator or modulator array whose individual pixel areas are arranged in a two dimensional X-Y matrix. However, the scope and content of the invention is not to be restricted thereto since a modulator in accordance with the invention can take any shape, including a three dimensional shape having multiple layers.

Figure 1:
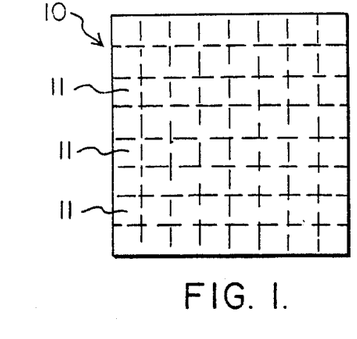
FIG. 1 is an enlarged plan view of an optically addressable spatial light modulator 10 in accordance with the invention wherein the individual pixel cells 11 of the modulator are arranged in an 8 by 8 X—Y matrix.

FIG. 1 is an enlarged view showing a modulator array 10 whose individual pixel areas 11 are arranged in an exemplary square, 8×8 X—Y, pixel matrix. Normally, modulator 10 is much larger, for example modulator 10 may comprise a 128×128, or a 1024×1024 pixel matrix. By activating selected ones of the individual pixel areas 11 of the modulator, an image or data can be stored therein for readout by a reading wavefront. As will be described, when modulator 10 includes a ferroelectric liquid crystal, the image or data that is stored in modulator 10 is non-volatile, and it can be erased as is desired.

In accordance with features of the invention, a pattern of conductive elements 12 and a coplanar continuous layer 13 having apertures in which the conductive elements are located is associated with and define each modulator pixel 11. As will be apparent, these conductive pixel elements 12 may be either transmissive of a reading wavefront, or they may be reflective of a reading wavefront. Thus, the term conductive element and conductive reflector is used interchangeably herein when making reference to pixel elements 12. Also, apertured layer 13 may be either transmissive of or opaque to the reading wavefront. In this configuration of the invention, an annular, ring-shaped gap exists between each pixel element 12 and the closely adjacent portion of the apertured layer 13. As a further feature of the invention, a light blocking, generally annular shaped opaque member 15 is provided for each modulator pixel. These opaque members 15 are spaced from the common plane of the pixel elements 12 and the apertured layer 13, and the opaque members are positioned so as to block light that may tend to pass through this annular area of each modulator pixel 11.

Figure 2:
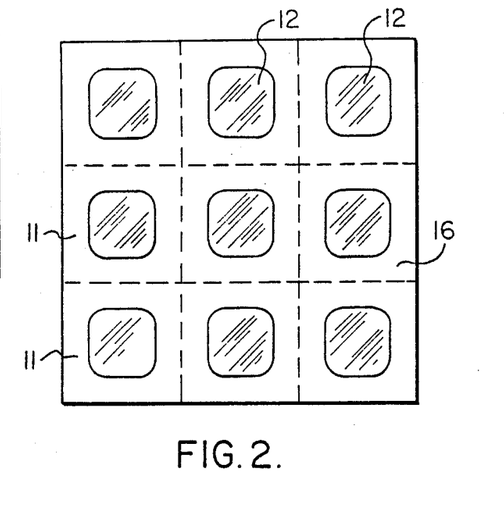
FIG. 2 is an enlarged view of a 3 by 3 portion of the modulator of FIG. 1, showing individual pixel reflectors 12 that are associated with each modulator pixel 11.

FIG. 2 is an enlarged view of a portion of the modulator of FIG. 1, showing the individual pixel conductive elements or reflectors 12 that are associated with a 3-pixel by 3-pixel portion of modulator 10. When modulator 10 is configured to operate in a transmission mode, elements 12 may be formed from a material such as indium tin oxide, this material being transparent to visible light. When modulator 10 is configured to operate in a reflection mode, elements 12 may be formed from a material such as aluminum, this material operating to reflect visible light.

FIG. 2 is a view from the side of the modulator against which the read beam(s) is directed when elements 12 are metal reflectors. That is, a read beam will impinge upon a pixel reflector 12, and will be reflected therefrom. However, the read beam will have its polarization rotated only when the overlying liquid crystal pixel area (not shown) has been previously written or switched, as will be described. As will also be apparent, elements or reflectors 12 occupy a generally flat plane (i.e. the plane of the figure) that is defined by the surface of an underlying photosensitive layer or film 16. As will also be apparent, photosensitive layer 16 may comprise a photodiode or a photoconductor, and if a photoconductor, the film may be a continuous film or a patterned discontinuous film.

While the shape of each individual pixel area is not critical to the scope and content of the invention, the pixel areas are shown herein as substantially square areas. As an example of another shape for elements or reflectors 12, in order to reduce crosstalk that may be created in the imaging of one modulator 10 onto another modulator 10, it may be desirable to provide a different geometric shape for pixel reflectors 12, such as for example a round shape, since the area of diffraction through a circular pixel is less than the area of diffraction through the square pixel that is defined by essentially square elements or reflectors 12.

The dimensions of pixel elements or reflectors 12 are not critical to the invention. However, it is contemplated that they be formed using thin film and photolithographic technologies, and that they may be in the range of 10 to 200 microns square. Small size pixels will provide high resolution, whereas larger size pixels may be more useful where ease of physical alignment is important.

When elements 12 are transmissive, these elements can be formed as multiple electrically conductive film layers, and when the elements comprise reflectors, they can be formed of an electrically conductive material such as a metal. The importance of elements 12 being electrically conductive is that when a smaller underlying area of photosensitive film 16 is written, the resulting conductivity of this smaller area of film 16 spreads to the entire pixel area that is defined by the element 12, and this entire pixel area of the liquid crystal switches.

As those skilled in the art will appreciate, the exposed photosensitive area 16 of FIG. 2 that exists between adjacent pixel reflectors 12 is an area through which light can leak, providing the possibility of interference between modulator writing and reading operations. Yet, area 16 must be maintained greater than a minimum value (that is, pixel reflectors 12 cannot be placed too close together) in order to prevent problems such as photosensitive layer electrical charge leakage from one pixel area to an adjacent pixel area. In addition, the voltage division that occurs between photosensitive layer 16 and the liquid crystal layer (to be described) may be adversely affected by leakage of light through the exposed photosensitive area 16 of FIG. 2.

Figure 3:
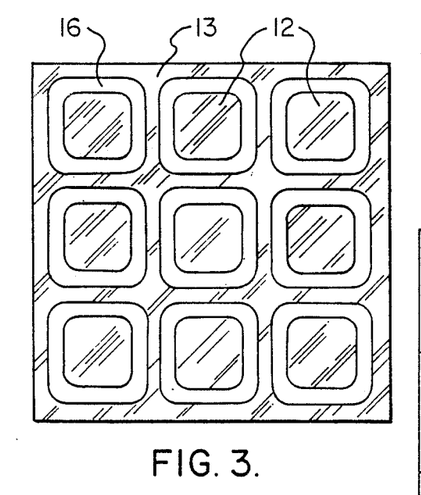
FIG. 3 is a view similar to FIG. 2 wherein an apertured layer 13 is shown coplanar with reflectors 12.

Problems of this type are minimized by the construction and arrangement of FIG. 3 which shows a feature of the invention providing a continuous apertured layer 13 associated with the array of pixel reflectors 12. Apertured layer 13 may be formed of metal, and it contains one square aperture for each of the modulator pixels 11. A pixel reflector 12 is centered in each of the apertures in layer 13. Apertured layer 13 is coplanar with pixel elements 12, and it is separated or isolated from each element 12 by an annular gap or ring through which photosensitive layer 16 is exposed. Since layer 13 and reflectors 12 occupy the same common plane, they may be formed by the same manufacturing step. As stated, this common plane is defined by the surface of the underlying photosensitive layer 16. Metal layer 13 may be connected to ground potential, although within the scope of the invention layer 13 can be connected to a source of bias potential, for example a source of positive DC potential.

Figure 4:
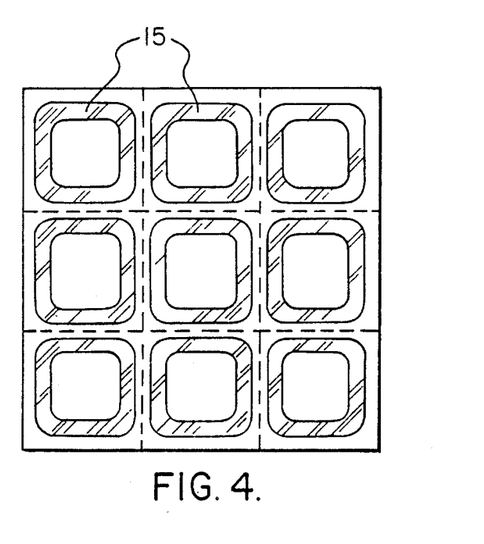
FIG. 4 is a view similar to FIG. 3 wherein an overlying layer of opaque rings 15 is shown, the rings 15 operating to block reading light from passing to the exposed, ring-shaped portions 16 of the FIG. 3 photosensitive layer.

While the arrangement of FIG. 3 minimizes the exposed area of photosensitive layer 16 to the small annular gap shown in FIG. 3 for each pixel, some detrimental light leakage may still occur through this gap. FIG. 4 shows an additional feature of the invention where an annular, ring-shaped, light-blocking, member 15 is associated with each modulator pixel 11. All of the blocking members 15 (i.e. one member 15 for each modulator pixel 11) are located in a plane that is parallel to and overlies the plane that is occupied by reflectors 12 and layer 13. That is, the plane of annular opaque members 15 is spaced to the front of the FIGS. 2 and 3 plane that is occupied by reflectors 12 and layer 13.

Members 15 are located so as to overlie the annular gaps shown in FIG. 3, so as to block writing/reading light from passing to or through the underlying photosensitive layer 16 shown in FIG. 3.

Figure 5:
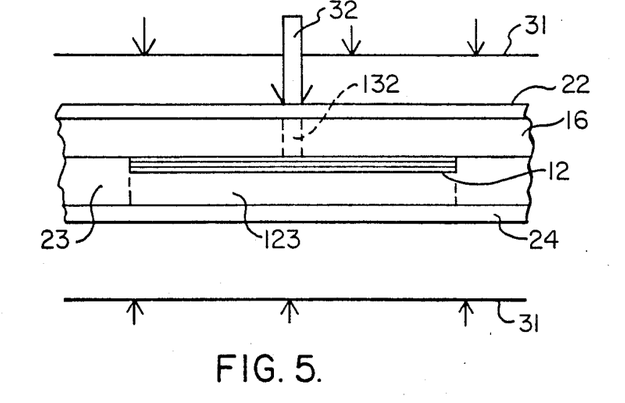
FIG. 5 is a side view of one of the pixels 11 of modulator 10, showing a generic photosensitive layer embodiment of the invention.

FIG. 5 is a side view of one pixel of the modulator. This figure will be used to describe a generic mode of the invention where conductive elements 12, one of which is provided for each modulator pixel, are either transparent to reading wavefront 31, or alternatively operate to reflect the reading wavefront. In either case, each individual modulator pixel is switched by operation of a writing beam 32, as this beam selectively activates data-determined pixel's of photosensitive layer 16. In FIG. 5, writing beam 32 is shown as having a cross-sectional area that is smaller than the area of a modulator pixel, i.e. the area of a conductive element 12. Operation of writing beam 32 activates a similar small area 132 of photosensitive layer 16, thus causing the electrical potential of conductive film 22 to be applied through area 132 to a similar small area of this pixel's conductive element 12. However, because element 12 is electrically conductive, the area of liquid crystal layer 23 that is switched is not limited to this small area, but rather the larger pixel area 123 of liquid crystal layer 23, as is defined by the shape of conductive element 12, is switched.

Consider first the case where conductive elements 12 are transparent to reading wavefront 31. In this case, the reading wavefront may impinge upon the modulator from either or both sides, as is represented in FIG. 5 by the two wavefronts 31. Since conductive elements 12 are in this case transparent to reading wavefront 31, the direction in which reading wavefront 31 is directed to the modulator is not critical to its operation. As is well known to those of skill in the art, the polarization of reading wavefront 31 will be rotated, as the wavefront passes through the modulator, in only the pixel areas 123 of liquid crystal layer 23 that have been switched by a writing beam 32.

In the case where conductive elements 12 are opaque to reading wavefront 31, i.e. they are reflector elements, the reading wavefront must be directed to the modulator from the side opposite the side against which writing beam 32 is directed. This is shown in FIG. 5 by the lower of the two wavefronts 31. As is well known to those of skill in the art, the lower reading wavefront 31 of FIG. 5 will be reflected from all reflector elements 12. However, the polarization of reading wavefront 31 will be rotated in only the pixel areas 123 of liquid crystal layer 23 that have been switched by a writing beam 32.

As stated previously, the photosensitive portion of each pixel area 11 of modulator array 10 may take the form of a photodiode or a photoconductor. In either case, a substantially continuous photosensitive layer 16 is deposited over a transparent conducting oxide film that has been placed on a substrate member such as a glass plate. As will be apparent, when photosensitive layer 16 is configured to operate in the photoconductor mode, the layer may be a continuous layer, or a patterned layer.

Figures 6, 7:
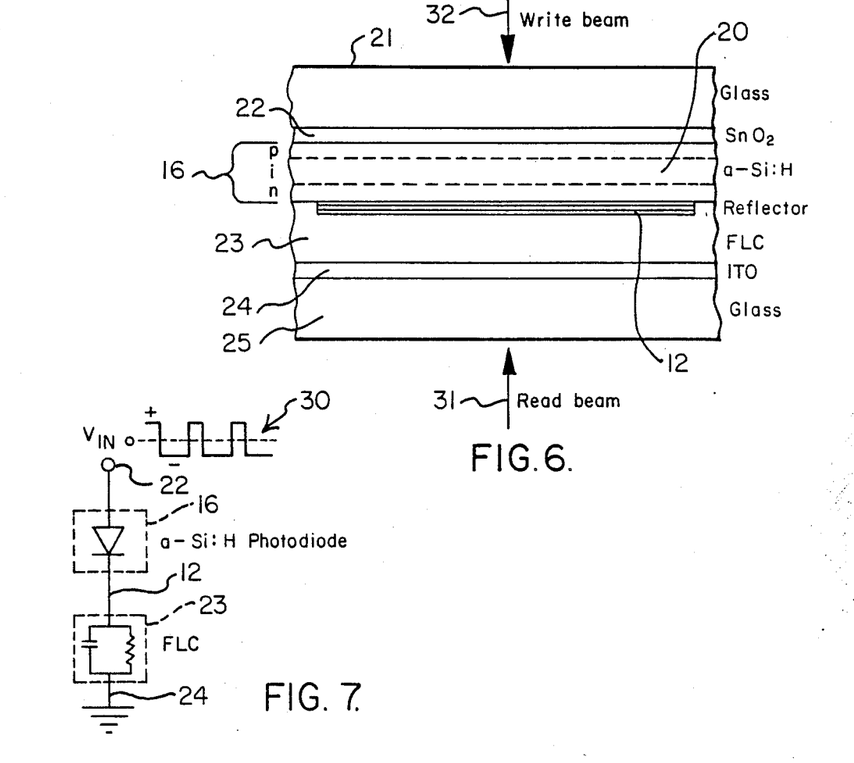
FIG. 6 is a side view of one of the pixels 11 of modulator 10, showing a photodiode embodiment of the invention.
FIG. 7 is a simple equivalent circuit of the photodiode embodiment of FIG. 6.

FIG. 6 is a side view of one pixel of the modulator in which each pixel photosensor or photosensitive portion 16 is configured as a photodiode. FIGS. 5 and 6 use the same reference numerals where appropriate. Photosensor 16 may be an exemplary 3 microns thick. The photodiode portion of this device is provided by one of more layers 16 of an a-Si:H based material that have been coated onto glass plate 21 and its transparent conducting oxide film 22.

Typically, layer 16 is a p-i-n multilayer film that is deposited by plasma enhanced chemical vapor deposition (PECVD) of silane and other gases onto a heated substrate. The order of layer 16 can of course be reversed. A thin p-type layer, on the order of 200 Angstroms thick, is formed by adding approximately 0.5 percent diborane to the silane. The i-layer contains no dopants and is typically about 3 microns thick, although it can be thinner. The n-type layer may be formed by adding approximately 0.5 percent phosphene to the silane. The n-layer is also about 200 Angstroms thick, or perhaps less. A thinner n-layer produces a somewhat more leaky diode, but improves the resolution of the device by providing lower lateral conductivity. The spectral response of the photodiode may be shift to longer wavelengths by incorporating germanium into layer 20, or to shorter wavelengths by incorporating carbon into the layer.

In alternate configurations, an i-layer alone can be deposited on conducting oxide layer 22 to form a rectifying heterojunction, or a Schottky barrier diode can be used.

As stated previously, the reflector portion 12 of the FIG. 6 device may be formed, for example, as a dielectric layer of alternating films having a high index of refraction, such as titanium dioxide, and a low index of refraction, such as magnesium fluoride, that are deposited over a portion of layer 16. An example would be a stack of dielectric films, each film layer being $\frac{1}{4}$ wavelength thick relative the frequency of the reading beam.

Due to the fact that an individual metal reflector 12 is provided for each one of the modulator pixels 11, the individual pixel areas of the continuous photodiode layer 16 remain electrically isolated (i.e they are not shorted together as they would be by use of a continuous metal reflector film), and the individual modulator pixel areas can be separately addressed and activated by write beam(s) 32. The use of an individual reflector 12 for each pixel area, however, provides high total reflection for the modulator.

The device of FIG. 6 is completed by a liquid crystal layer 23, which is preferably a bistable liquid crystal film such as a ferroelectric liquid crystal (FLC), and by a glass plate 25 and its transparent conducting oxide film 24. An exemplary thickness for a ferroelectric liquid crystal layer 23 is in the range of from 1 to 2 microns. For purposes of simplicity, the continuous metal layer 13 of FIG. 3 and the light blocking annular members 15 of FIG. 4 are not shown in FIG. 6. It is to be understood however that these additional members are to be included in the device of FIG. 6 in accordance with features of the invention. When they are so included, metal layer 13 is deposited on the same surface of photosensitive layer 16 as reflector elements 12, and light blocking members 15 are spaced therefrom, for example on the surface of conducting oxide film 24 that confronts liquid crystal 23.

Other well known features may be provided for modulator 10, such as, for example, thin alignment layers located immediately adjacent both sides of the liquid crystal layer, to orient the liquid crystal layer in a desired direction, as is well known to those skilled in the art.

The equivalent circuit of the device of FIG. 6 device is shown in FIG. 7 wherein like reference numerals have been applied to like elements. FIG. 7 also shows an exemplary source of energizing clock voltage 30 that is connected between conducting layers 22 and 24.

For the device of FIG. 7, the short time duration positive portion of waveform 30 provides a forward bias to the photodiode photosensitive layer 16. During this portion of waveform 30 most of applied voltage 30 is dropped across liquid crystal 23. This voltage field switches the small liquid crystal pixel area 11 to its OFF rotation or erased state. In this OFF state, the state of polarization of reading light 31 of FIG. 6 will not be rotated as the reading light wavefront passes through the OFF liquid crystal pixel area 11 to the underlying reflector 12.

The negative portion of waveform 30, which may be of a long or longer time duration, reverse biases the photodiode photosensitive layer 16. The state of the small pixel area of liquid crystal layer 16 does not change from its OFF to its ON state unless at this same time writing illumination 32 (FIG. 6) is applied to photosensitive layer 16 from the opposite side of modulator 10 from reading light 31. When writing light 32 is supplied during this negative portion of waveform 30, current flows through illuminated photodiode 16, and operates to switch this pixel portion of liquid crystal layer 23 ON. In this ON condition, the state of polarization of reading beam 31 will be rotated, and the polarization-rotated read beam 31 will be reflected off of reflector element 12. Waveform 30 can take a variety of shapes, and need not be a periodic waveform, as shown.

Figure 8:
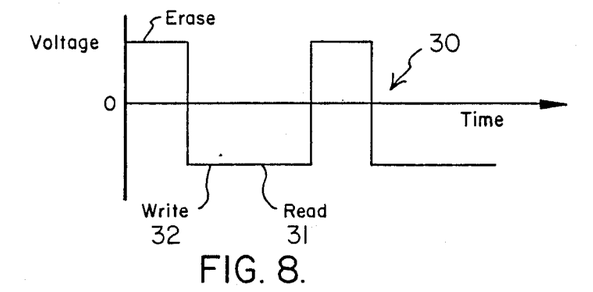
FIG. 8 is an enlarged view of the voltage waveform 30 of FIG. 7.
Figure 9:
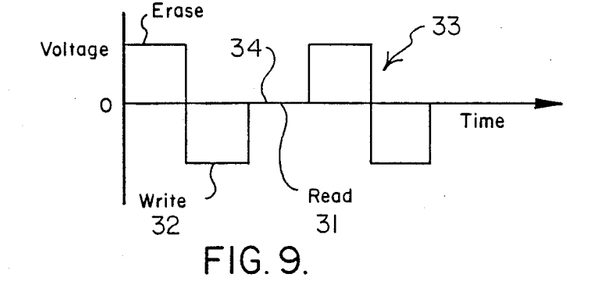
FIG. 9 shows an alternative voltage waveform 33 for use in FIG. 7, this waveform having particular utility when the liquid crystal of the photodiode embodiment is a ferroelectric liquid crystal.

Two exemplary clock waveforms 30 are shown in FIGS. 8 and 9. The waveform of FIG. 8 is identical to that of FIG. 7, wherein exemplary times of occurrence of writing beam 32 and reading beam 31 are shown in FIG. 8. The alternative waveform 33 of FIG. 9 provides a quiescent portion 34 during which read beam 31 is applied to the modulator. This quiescent portion 34 can be of variable time duration.

Waveform 33 is especially useful when liquid crystal layer 23 comprises a ferroelectric liquid crystal. Such a liquid crystal is highly resistive and must be actively erased, as by the positive portion of waveform 33. Since the ferroelectric liquid crystal is bistable, it remains in its ON state for the duration of quiescent portion 34. The associated modulator pixel 11 can be read by read beam 31 at any time during or after the occurrence of write beam 32.

The clock pulse rate provided by waveforms 30 and 33 are not critical to the invention. While a typical pulse rate is 10 kHz, those skilled in the art will appreciate that the pulse rate depends upon the application in which the modulator is used, and upon the characteristics of the modulator itself.

FIG. 7 shows a conductive connection 12, indicating the use of a conductive transparent element 12 or a conductive reflector element 12 in arrangement of FIG. 6.

Figure 10:
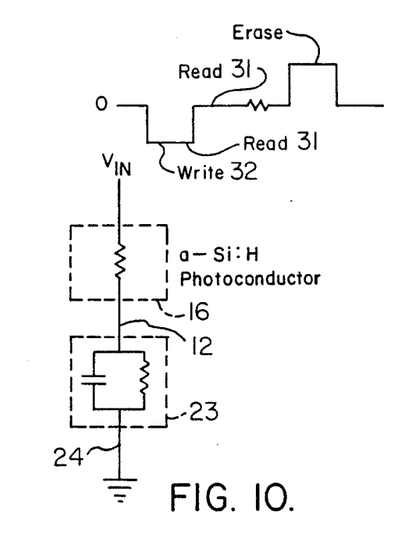
FIG. 10 is a simple equivalent circuit of a photoconductor embodiment of the invention that is similar in construction to that of FIG. 6, but wherein the continuous photodiode layer 16 of FIG. 6 is configured as a continuous photoconductor layer in FIG. 10.

FIG. 10 is an equivalent circuit for one pixel of a modulator 10 that is structurally the same as that shown in FIG. 6, the different being that the photosensitive portion 16 is configured as a continuous n-i-n photoconductor layer. In this arrangement, the modulator's supply voltage Vin provides a negative portion during which write beam 32 may operate to selectively switch certain ones of the liquid crystal pixel areas 23, in order to store data in the selected modulator pixels. Thereafter, either during the same negative portion of the Vin voltage waveform, or during the following zero portion of the waveform, the data stored in the modulator pixels may be read by reading wavefront 31, as is indicated in FIG. 10. This reading wavefront 31 is, of course, of such a distinctive character so as to not function as a writing source.

The supply voltage Vin of FIG. 10 also provides a positive polarity portion to all modulator pixels. During this positive portion of Vin, all data that was previously stored in the various pixels of the modulator by operation of write beams 32 can be erased by the application of full-surface erase illumination to the modulator, as is indicated in FIG. 10.

Figure 11:
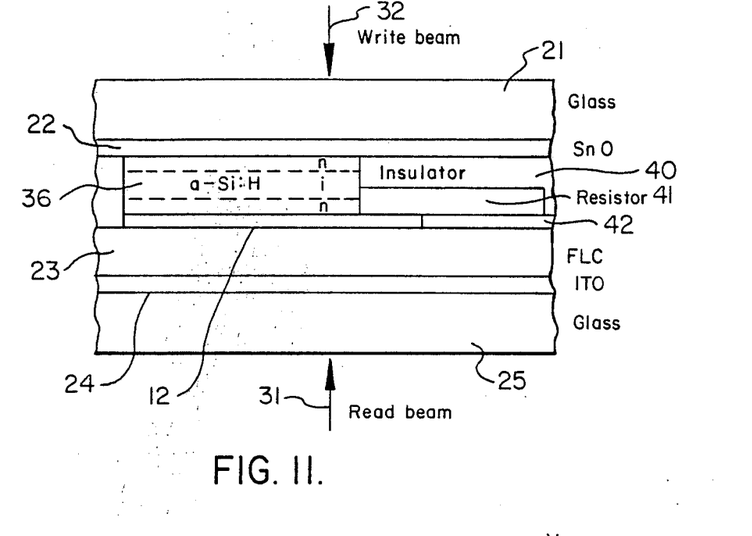
FIG. 11 is a side view of one of the pixels 11 of modulator 10, showing a second photoconductor embodiment of the invention wherein photoconductor layer 36 is a patterned layer that provides an individual pixel portion of layer 36 for each modulator pixel 11.

FIGS. 11 is a side view, similar to FIG. 6, where the photosensitive portion 36 of each modulator pixel 11 is configured as a photoconductor. In this embodiment of the invention the photosensitive layer 36 (generically identified as 16 elsewhere herein) is not a continuous photosensitive layer. However, photoconductor pixel areas 36, while not being physically interconnected, do cover substantially the entire area of conductive film 22. FIGS. 6 and 11 use the same reference numerals where appropriate.

Figure 12:
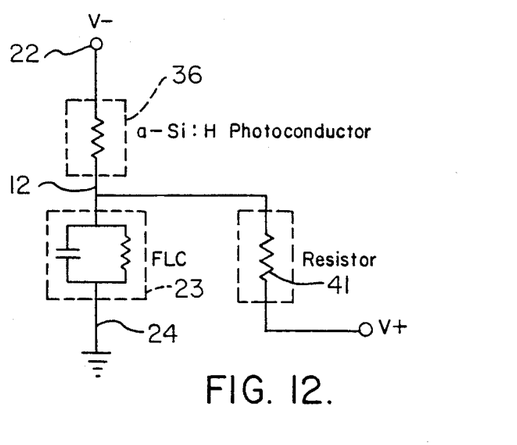
FIG. 12 is a simple equivalent circuit of the photoconductor embodiment of FIG. 11, and FIGS. 13 and 14 are simple equivalent circuits of further photodiode and photoconductor embodiments of the invention wherein apertured layer 13 of FIG. 3 is connected to ground potential or to a source of DC potential.

The photoconductor construction and arrangement of FIG. 11 may provide greater photosensitivity than the photodiode embodiment of FIG. 6, but this advantage is achieved at the cost of greater fabrication complexity. FIG. 12 is an equivalent circuit representation of the photoconductor device of FIG. 11. The modulator pixel that is defined by the conductive element 12, i.e. by the reflector 12, of FIG. 11 is for example 20 microns square.

The photoconductor portion 36 of FIG. 11 is formed by depositing an n-i-n layer, in which the n-layers produce ohmic contacts to conductive layer 22 and to pixel reflectors 12. An insulator layer 40, a resistor layer 41 and an insulator layer 42 are deposited on a portion of each pixel area of conductive layer 22. Resistor layer 41 electrically connects to reflector element 12. As seen in FIG. 12, conductive layer 22 is connected to a source of negative voltage, conductive layer 24 is connected to ground potential, and resistor 41 is connected to a source of positive potential. For example, the negative source of FIG. 12 may comprise a voltage of $-15$ volts DC and the positive source may comprise a voltage of $+15$ volts DC.

In this embodiment, the voltage applied to liquid crystal pixel area 23 is dependent upon the ratio of the resistance of photoconductor pixel portion 36 to the resistance of resistor 41.

When the pixel area of photoconductor 36 of FIGS. 11-12 is illuminated by write beam 32, the resistance of this small portion of photoconductor layer 36 lowers. As a result, the modulator's pixel area, as defined by the adjacent conductive reflector element 12, is switched ON by virtue of the switching of the adjacent pixel portion of liquid crystal layer 23. Without this write illumination, a modulator pixel 11 does not switch. When the modulator is subsequently subjected to a modulator reading wavefront 31, wavefront energy passes through the liquid crystal pixel areas that have been switched, and the polarization of this portion of the reading wavefront is rotated, as above described. This portion of the read wavefront energy is then reflected off of the associated pixel reflector elements 12.

In situations where the light-conductivity and the dark-conductivity of photoconductive layer 36 vary from one manufacturing deposition run to another, a feature of the invention provides a reading wavefront illuminated portion of photoconductive layer 36 to function as resistor 41. In this embodiment, write beam 32 operates on photoconductive portion 36 to switch the pixel area ON, whereas illumination of photoconductive resistor 41 operates to switch the pixel area OFF.

In the embodiment of FIGS. 11-12 the apertured film 13 of FIG. 3 is not used, and the light blocking members 15 of FIG. 4 can be enlarged to cover the entire exposed area shown in FIG. 2, if desired.

In the photoconductor embodiment of FIGS. 11-12 the write state is a steady-state condition, that is, write beam 32 is continuously applied to each modulator pixel 11 in which data is to be stored by way of a switched pixel area of liquid crystal layer 23. The modulator is read by applying reading wavefront 31, as writing beams 32 remain to be applied to the modulator. The modulator is later erased of all data by turning off all writing beams 32.

In situations where resistor 41 is photosensitive, a pixel area of liquid crystal layer 23 is switched ON by illumination of portion 36, while portion 41 is not illuminated, or alternatively by the illumination of portion 36 to a greater extent than portion 41 is illuminated. A pixel area of liquid crystal layer 23 is switched OFF in this case by illumination of portion 41, while portion 36 is not illuminated, or alternatively by the illumination of portion 41 to a greater extent than portion 36 is illuminated.

Figure 13:
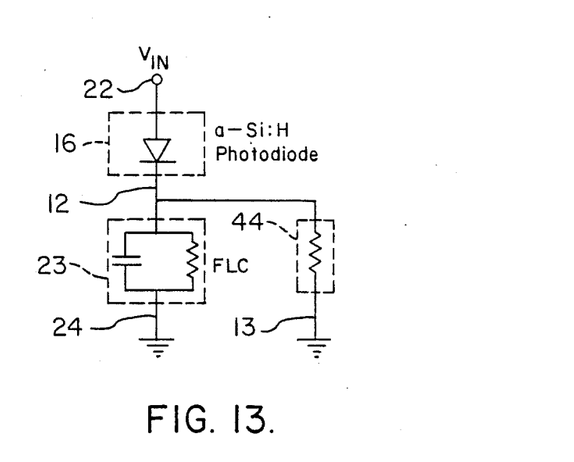
Figure 14:
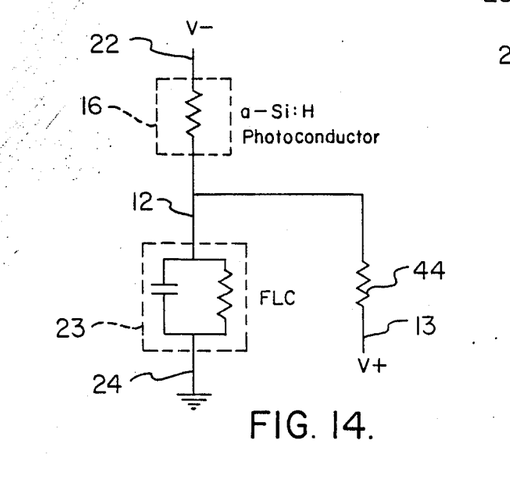

FIGS. 13 and 14 show photodiode and photoconductor embodiments, respectively, of the invention wherein the apertured layer 13 of FIG. 3 is an electrically conductive layer that is connected to ground potential. The showing of FIG. 13 is of a continuous photosensitive layer 16 where each pixel area 11 of the modulator is configured as a photodiode, as is also shown in FIG. 7. The showing of FIG. 14 is of a continuous photosensitive layer 16 where each pixel area 11 of the modulator is configured as a photoconductor, as is also shown in FIG. 10.

With reference to FIGS. 7 and 10, it can be seen that the supply voltage Vin is divided between photosensitive area 16 and liquid crystal pixel area 23. For an exemplary 3 micron thick a-Si:H layer 16, and a 1 micron thick liquid crystal 23, the capacitance of the two layers is approximately equal. Therefore, even in the absence of write illumination 32, half of this voltage Vin is dropped across the liquid crystal layer 23. This effect may cause the liquid crystal pixel area to slowly switch ON in the absence of write illumination 32.

Apertured layer 13 of FIG. 3, whose primary function is to block light from passing between pixel conductive elements or reflectors 12, can be connected to ground potential as shown in FIG. 13, or to a source of DC potential as is shown in FIG. 14.

When this is done, an unilluminated pixel area of the liquid crystal layer 23 is prevented from slowly assuming a switched ON state. The photosensor layer immediately adjacent elements 12, represented in FIGS. 13 and 14 by reference numeral 44, provides a small but significant conducting path 44 between the isolated conductive pixel reflectors 12 and conductive apertured layer 13. By connecting layer 13 to ground potential, as in FIG. 13, or to a source of positive potential, as in FIG. 14, all modulator pixels 11 that are not write-illuminated are maintained in the OFF state. For example, a 10 nanometer thick n-layer having a resistivity of $10^4$ ohm-cm exhibits a sheet resistance of approximately $10^{10}$ ohms/sq. For 100 micron square pixel reflectors 12 that are separated from layer 13 by 5 microns, the leakage resistance per pixel is $10^8$ ohms. This results in a time constant of about 50 microseconds. This time constant operates to drain the charge off of the liquid crystal pixel area sufficiently fast to maintain the pixel in the OFF state.

The embodiments of FIGS. 13 and 14 also provide a means whereby the switching threshold of the modulator, or the switching threshold of individually selected modulator pixels, may be set or adjusted. More specifically, by the use of a DC supply voltage at terminal 13 of FIGS. 13 and 14 (i.e. apertured layer 13) the optical sensitivity threshold of the associated modulator pixel 11 can be controlled. Thus, the magnitude of illumination of a write beam 32 that will operate to switch one or more modulator pixels 11 can be set to a desired level. For example, in the diode embodiment of FIG. 13, a negative voltage at terminal 13 causes the modulator pixel to switch ON with less write illumination than when terminal 13 is connected to ground potential, and a positive voltage at terminal 13 requires greater write illumination in order for the modulator pixel to switch ON. This DC potential (shown only in FIG. 14 as a positive DC potential) may be either a steady state DC voltage, or it may be a pulsed voltage source whose presence is synchronized to the application of write beam(s) 32.

An additional feature of the invention involves the use of a thermally conductive film to maintain modulator 10 at its desired temperature. During high frequency operation, a substantial amount of heat may be dissipated in modulator 10. To carry this heat away, a layer of thin diamond, diamond-like amorphous carbon, or cubic boron nitride may be deposited on either side of one or both of the glass plates 21–25. Alternatively, a diamond, diamond-like or boron nitride film may be substituted for one or both of the glass plates 21–25, thereby both conducting heat away and producing a very thin modulator 10.

Within the spirit and scope of the invention, other well known features, such as the use of liquid crystal alignment layers, can be provided as is desired.

The invention has been described with reference to a number of embodiments thereof and modifications thereto. It is readily appreciated that yet other embodiments and modifications of the invention will be apparent to those of skill in the art. Thus, the foregoing detailed description is not to be taken as a limitation on the scope and spirit of the invention.

What is claimed is:

1. A multi-pixel liquid crystal spatial light modulator having a plurality of picture elements, comprising;
   a pair of spaced transparent electrically conductive films,
   a photosensitive film carried by one of said conductive films,
   a plurality of conductive elements carried by said photosensitive film and arranged to define the position of each individual one of said plurality of modulator picture elements, each individual one of said conductive elements being electrically isolated from all other conductive elements,
   an apertured film carried by said photosensitive film substantially coplanar with said conductive elements, said apertured film having apertures formed therein and arranged in the form of the modulator picture elements, so as to define a plurality of areas of uncovered photosensitive film area, each of said uncovered areas of photosensitive film surrounding one of said conductive elements,
   liquid crystal activating voltage source means connected to said conductive films,
   chiral smectic liquid crystal means confined between said one conductive film and said photosensitive film,
   write beam means selectively directable to the side of said photosensitive film opposite from said plurality of conductive elements,
      whereby individual picture elements of said modulator are individually addressed by activating the portion of said photosensitive film that is associated with said addressed picture elements,
      thereby causing the corresponding conductive-element-defined chiral smectic liquid crystal picture elements to switch states, and read wavefront means directable to a side of said modulator.

2. The spatial light modulator of claim 1 wherein said liquid crystal means is a bistable ferroelectric liquid crystal means, and wherein said photosensitive film is constructed and arranged to define one of the group of photodiode and photoconductor.

3. The spatial light modulator of claim 1 wherein said conductive elements are formed in a geometric shape to minimize the area of diffraction of a light wavefront impinging upon such a shape, and wherein said apertures are of a similar geometric shape.

4. The spatial light modulator of claim 3 wherein said conductive elements are substantially round elements and said apertures are substantially round apertures.

5. The spatial light modulator of claim 1 wherein said apertured film is an opaque film, and including a masking member comprising a plurality of opaque areas corresponding to said plurality of areas of uncovered photosensitive film area, each of said opaque areas overlying one of said plurality of uncovered areas of photosensitive film.

6. The spatial light modulator of claim 5 wherein said masking member is mounted on the opposite side of said liquid crystal means from said photosensitive film.

7. The spatial light modulator of claim 6 wherein said liquid crystal means is a bistable ferroelectric liquid crystal means, and wherein said photosensitive film is constructed and arranged to define one of the group of photodiode and photoconductor.

8. The spatial light modulator of claim 7 wherein said conductive elements are substantially round opaque reflector elements, said apertures are substantially round apertures, and said opaque areas comprises substantially round opaque rings.

9. The spatial light modulator of claim 1 wherein said liquid crystal means is a bistable ferroelectric liquid crystal means, and wherein said apertured electrically film is an electrically conductive film, and including a source of potential adapted to drain charge from unswitched-state ferroelectric liquid crystal means picture element areas connected to said apertured conductive film.

10. The spatial light modulator of claim 9 wherein said photosensitive film is constructed and arranged to define one of the group of photodiode and photoconductor.

11. The spatial light modulator of claim 10 wherein said conductive elements are opaque reflector elements, said apertured film is an opaque film, and including a masking member comprising a plurality of opaque areas corresponding to said plurality of areas of uncovered photosensitive film area, each of said opaque areas overlying one of said plurality of uncovered areas of photosensitive film.

12. The spatial light modulator of claim 11 wherein said masking member is mounted on the opposite side of said ferroelectric liquid crystal means from said photosensitive film.

13. The spatial light modulator of claim 12 wherein said reflector elements are formed in a geometric shape to minimize the area of diffraction of a light wavefront impinging upon such said reflector elements, and wherein said apertures are of a similar geometric shape.

14. The spatial light modulator of claim 13 wherein said reflector elements are substantially round reflectors, said apertures are substantially round apertures, and said opaque areas comprises substantially round opaque rings.

15. The spatial light modulator of claim 1 including plate means for supporting said pair of spaced transparent electrically conductive films, said plate means being selected from the group glass, diamond or diamond-like film and boron nitride film.

16. The spatial light modulator of claim 15 wherein said a photosensitive film is an amorphous silicon photosensitve film.

17. The spatial light modulator of claim 16 wherein said amorphous silicon photosensitive film is configured from the groups p-i-n photodiode film and n-i-n photoconductor film.

18. A method for providing an optically addressable liquid crystal spatial light modulator having a pixel matrix, comprising the steps of;
providing a pair of spaced, light-transparent, conductive films,
providing a light-sensitive film on one of said conductive films in confronting relation to the other of said conductive films,
confining liquid crystal means between said other conductive film and said light-sensitive film,
providing a plurality of isolated electrically conductive elements on said light-sensitive film, said conductive elements being arranged in the pattern of said pixel matrix, and
providing an apertured film on the surface of said light-sensitive film, the apertures in said film being arranged in the pattern of said pixel matrix,
whereby individual pixels of said modulator are addressed by light activation of the portion of said light-sensitive film associated with the conductive elements that are associated with the addressed pixels.

19. The method of claim 18 including the steps of,
providing said an apertured film as an electrically conductive film, and
providing a source of bias potential connected to said apertured film, said source of bias potential being controllable to control the sensitivity threshold of said spatial light modulator pixel matrix.

20. The method of claim 18 including the step of providing ferroelectric liquid crystal means as said liquid crystal means.

21. The method of claim 18 including the step of providing amorphous silicon light-sensitive film as said light-sensitive film.

22. The method of claim 21 wherein said amorphous silicon light-sensitive film is constructed and arranged in accordance with the group of photodiode and photoconductor.

23. The method of claim 18 including the step of providing a masking layer on the opposite side of said liquid crystal means from said light-sensitive film, said masking layer providing an optical mask for the light-sensitive film areas that surround each of said conductive elements.

24. The method of claim 22 including the step of providing a pair of spaced light-transparent plate means for the support of said pair of light-transparent, conductive films.

25. The method of claim 24 wherein said plate means is selected from the group glass, diamond film, diamond-like film and boron nitride film.

26. The method of claim 25 including the step of providing ferroelectric liquid crystal means as said liquid crystal means.

27. The method of claim 26 including the step of providing amorphous silicon light-sensitive film as said light-sensitive film.

28. The method of claim 27 wherein said amorphous silicon light-sensitive film is constructed and arranged in accordance with the group of photodiode and photoconductor.

29. The method of claim 27 wherein said amorphous silicon light-sensitive film is constructed and arranged in accordance with the group p-i-n photodiode and n-i-n photoconductor.

30. The method of claim 18 including the steps of providing said an apertured film as an electrically conductive film,
providing a masking layer on the opposite side of said liquid crystal means from said light-sensitive film, said masking layer providing an optical mask for the light-sensitive film areas that surround each of said conductive elements, and
providing a source of bias potential connected to said apertured film, said source of bias potential operating to to drain charge from adjacent portions of said liquid crystal means.

31. The method of claim 30 including the step of adjusting the sensitivity threshold of said spatial light modulator by adjusting the magnitude of said source of bias potential.

32. The method of claim 31 including the step of providing a pair of spaced light-transparent plate means for the support of said pair of light-transparent and conductive films.

33. The method of claim 32 wherein said plate means is selected from the group glass, diamond film, diamond-like film and boron nitride film.

34. The method of claim 33 including the step of providing ferroelectric liquid crystal means as said liquid crystal means.

35. The method of claim 34 including the step of providing amorphous silicon light-sensitive film as said light-sensitive film.

36. The method of claim 35 wherein said amorphous silicon light-sensitive film is constructed and arranged in accordance with the group of photodiode and photoconductor.

37. The method of claim 35 wherein said amorphous silicon light-sensitive film is constructed and arranged in accordance with the group p-i-n photodiode and n-i-n photoconductor.

38. A reflection mode optically addressable spatial light modulator in the form of an array of pixel cells, comprising;
ferroelectric liquid crystal film means, photosensitive film means, a plurality N of pixel cells, each cell of which is defined by one of a plurality N of electrically conductive reflectors, each reflector having one side thereof in physical contact with one side of said liquid crystal film means, and having the other side thereof in physical contact with one side of said photosensitive film means, opaque apertured film means having one side thereof in physical contact with said one side of said liquid crystal film means, and having the other side thereof in physical contact with said one side of said photosensitive film means, said apertured film means having a plurality N of small apertures positioned to coincide with said N reflectors, each reflector being spaced from its adjacent aperture so as to define an exposed annular area of said photosensitive film means surrounding each of said reflectors, a source of liquid crystal switching voltage connected between the other side of said liquid crystal film means and the other side of said photosensitive film means, write illumination means operable to selectively illuminate said other side of said photosensitive film means, individual pixel cells of said modulator being addressed by activating selected portions of said photosensitive film means using said write illumination means, the selected portions defining a data input to be stored in the modulator, the photosensitive film means when so activated operating to connect said source of switching voltage in a series circuit extending through said selected portions of said photosensitive film means and through the associated reflectors to the associated portions of said liquid crystal film means, and read illumination means for direction modulator reading illumination toward said other side of said liquid crystal film means.

39. The light modulator of claim 38 wherein said photosensitive film means comprises photodiode film means, and said source of liquid crystal switching voltage operates to apply a first voltage polarity between said other side of said liquid crystal film means and said other side of said photodiode film means, to thereby erase all portions of said liquid crystal films means, and to subsequently apply a voltage of a second polarity between said other side of said liquid crystal film means and said other side of said photodiode film means, said write illumination means being operable during the period of application of said second polarity to store data in said modulator, and said read illumination means being operable thereafter to read data stored in said modulator.

40. The light modulator of claim 39 wherein said source of liquid crystal switching voltage includes a period of substantially zero potential, and wherein said read illumination means is operable to read data stored in said modulator during said period of substantially zero potential.

41. The light modulator of claim 39 wherein said apertured film means is electrically conductive, and wherein said other side of said liquid crystal film means and said apertured film means are both connected to the same electrical potential level.

42. The light modulator of claim 41 wherein said photodiode film means comprise amorphous silicon photodiode film means.

43. The light modulator of claim 42 including a plurality N of annular opaque members positioned to coincide with said N reflectors, said opaque elements being located adjacent said other side of said liquid crystal film means, and each of said opaque members overlying one of said exposed annular areas of said amorphous silicon photodiode film means surrounding each of said reflectors.

44. The light modulator of claim 38
wherein said photosensitive film means comprises a film photoconductor portion for each pixel cell of said modulator,
wherein each pixel cell includes film resistor means having one end portion electrically connected to the reflector of its pixel cell, said film resistor means having a second end portion,
wherein said source of liquid crystal switching voltage comprising a direct current source connected to apply a first voltage polarity to said other side of said photoconductor film means, and to apply a voltage of an opposite polarity to said second end portion of said resistor means, and
means connecting said other side of said liquid crystal film means to a polarity intermediate said first and second polarity.

45. The light modulator of claim 44 wherein said source of liquid crystal switching voltage is of a variable magnitude, and means operable to vary the magnitude of said source in order to control the write illumination sensitivity threshold of said modulator.

46. The light modulator of claim 45 wherein said photoconductor portions comprise amorphous silicon photoconductor portion.

47. The light modulator of claim 46 including a plurality N of annular opaque members positioned to coincide with said N reflectors, said opaque element being located adjacent said other side of said liquid crystal film means, and each of said opaque members overlying one of said exposed annular areas of said photoconductor portion surrounding each of said reflectors.

48. A transmission mode optically addressable spatial light modulator in the form of an array of pixel cells, comprising;

ferroelectric liquid crystal film means,
photosensitive film means,
a plurality N of pixel cells, each cell of which is defined by one of a plurality N of electrically conductive transparent elements, each transparent element having one side thereof in physical contact with one side of said liquid crystal film means, and having the other side thereof in physical contact with one side of said photosensitive film means, apertured film means having one side thereof in physical contact with said one side of said liquid crystal film means, and having the other side thereof in physical contact with said one side of said photosensitive film means, said apertured film means having a plurality N of small apertures positioned to coincide with said N transparent elements, each transparent element being spaced from its adjacent aperture so as to define an exposed annular area of said photosensitive film means surrounding each of said transparent elements, a source of liquid crystal switching voltage connected between the other side of said liquid crystal film means and the other side of said photosensitive film means, write illumination means operable to selectively illuminate said other side of said photosensitive film means, individual pixel cells of said modulator being addressed by activating selected portions of said photosensitive film means using said write illumination means, the selected portions defining a data input to be stored in the modulator, the photosensitive film means when so activated operating to connect said source of switching voltage in a series circuit extending through said selected portions of said photosensitive film means and through the associated conductive elements to the associated portions of said liquid crystal film means, and read illumination means for direction modulator reading illumination toward said liquid crystal film means.

49. The light modulator of claim 48 wherein said photosensitive film means comprises photoconductor film means, and said source of liquid crystal switching voltage operates to apply a first voltage polarity between said other side of said liquid crystal film means and said other side of said photoconductor film means, to thereby erase all portions of said liquid crystal film means, and to subsequently apply a voltage of a second polarity between said other side of said liquid crystal film means and said other side of said photoconductor film means, said write illumination means being operable during the period of application of said second polarity to store data in said modulator, and said read illumination means being concurrently operable during the period of application of said second polarity to read data stored in said modulator.

50. The light modulator of claim 49 wherein said apertured film means is electrically conductive, and wherein said apertured film means is connected to a voltage source of variable magnitude, and means operable to vary the magnitude of said source in order to control the write illumination sensitivity threshold of said modulator.

51. The light modulator of claim 50 including a plurality N of annular opaque members positioned to coincide with said N conductive elements, said opaque elements being located adjacent said other side of said liquid crystal film means, and each of said opaque members overlying one of said exposed annular areas of said photoconductor film means surrounding each of said conductive elements.

* * * * *